US011912535B2

(12) United States Patent
Bütler et al.

(10) Patent No.: US 11,912,535 B2
(45) Date of Patent: Feb. 27, 2024

(54) BRAKE DEVICE

(71) Applicant: Inventio AG, Hergiswil (CH)

(72) Inventors: Erich Bütler, Ebikon (CH); Romeo Lo Jacono, Gravesano (CH); Mischa Salvenmoser, Hitzkirch (CH)

(73) Assignee: INVENTIO AG, Hergiswil (CH)

( * ) Notice: Subject to any disclaimer, the term of this patent is extended or adjusted under 35 U.S.C. 154(b) by 52 days.

(21) Appl. No.: 17/754,065

(22) PCT Filed: Sep. 4, 2020

(86) PCT No.: PCT/EP2020/074847
§ 371 (c)(1),
(2) Date: Mar. 23, 2022

(87) PCT Pub. No.: WO2021/063631
PCT Pub. Date: Apr. 8, 2021

(65) Prior Publication Data

US 2022/0348439 A1 Nov. 3, 2022

(30) Foreign Application Priority Data

Sep. 30, 2019 (EP) .................................... 19200616

(51) Int. Cl.
*B66B 5/22* (2006.01)

(52) U.S. Cl.
CPC ..................................... *B66B 5/22* (2013.01)

(58) Field of Classification Search
CPC ......... B66B 5/22; B66B 19/002; B66B 7/044; B66B 7/041
See application file for complete search history.

(56) References Cited

U.S. PATENT DOCUMENTS 3,211,259 A * 10/1965 Tofanelli ................. B66B 7/022 187/408
2008/0128218 A1* 6/2008 Gremaud .................. B66B 5/22 187/250

(Continued)

FOREIGN PATENT DOCUMENTS

CN 101200259 A 6/2008
CN 103648954 A 3/2014

(Continued)

*Primary Examiner* — Diem M Tran
(74) *Attorney, Agent, or Firm* — William J. Clemens; Shumaker, Loop & Kendrick, LLP

(57) ABSTRACT

A brake device for a traveling body of an elevator installation brakes on a rail having first and second braking profiles. The brake device includes a forcing element and a counter-support. The forcing element has first and second forcing working faces for acting on the first and second profiles respectively. The counter-support has a first counter-support working face for acting on the first profile, and a second counter-support working face for acting on the second profile. The first forcing working face and the first counter-support working face are arranged opposite one another at the first profile and the second forcing working face and the second counter-support working face are arranged opposite one another at the second profile. The forcing element is spread to bring the first forcing working face into contact with the first profile and the second forcing working face into contact with the second profile.

12 Claims, 8 Drawing Sheets

(56) References Cited

U.S. PATENT DOCUMENTS

| | | | | |
|---|---|---|---|---|
| 2017/0008733 | A1* | 1/2017 | Fernandez | B66B 9/00 |
| 2019/0077637 | A1* | 3/2019 | Bhaskar | B66B 11/0438 |

FOREIGN PATENT DOCUMENTS

| | | | | |
|---|---|---|---|---|
| CN | 104936882 | A | 9/2015 | |
| CN | 105358462 | A | 2/2016 | |
| JP | S5656484 | A | 5/1981 | |
| JP | H0248390 | A | 2/1990 | |
| JP | H1087203 | A | 4/1998 | |
| WO | WO-2005063605 | A1 * | 7/2005 | B66B 7/02 |
| WO | 2011146071 | A1 | 11/2011 | |
| WO | 2014092721 | A1 | 6/2014 | |
| WO | 2017050697 | A1 | 3/2017 | |

* cited by examiner

BRAKE DEVICE

FIELD

The invention relates to a brake device, a guiding system for a traveling body of an elevator installation and an elevator installation.

BACKGROUND

In an elevator installation, a traveling body is typically moved essentially vertically between different floors along a travel path. There are often rails along the route. Brake rails are used to brake the traveling body. Guide rails are used to guide the traveling body. Typically, a rail performs both the function of a brake rail and a guide rail. Traveling bodies typically have one or more brake devices for braking on the rail that are triggered by a trigger signal. If a control device of the elevator installation detects an undesired or excessive motion of the traveling body, the control device, often a speed limiter, sends a trigger signal, usually in the form of increased tension in a speed limiter cable, to the brake device and thereby activates the brake device. The traveling body is safely stopped by the activated brake device. Today there is a trend toward rails made of sheet metal. Conventional brake devices can hardly be used on sheet metal rails, because the sheet metal profiles cannot withstand the loads caused by a conventional brake device.

The application EP3353104 discloses a brake device which distributes the normal forces more gently on a rail profile made of sheet metal.

JP H02 48390 A and JP S56 56484 A show brake devices for braking on rails, each having two braking profiles.

SUMMARY

One object can now be seen in the fact that an improved brake device and an elevator installation that is improved overall is developed.

According to a first aspect of the invention, a brake device solves the problem. The brake device is suitable for braking on a rail having a first braking profile and a second braking profile. The brake device comprises a forcing element and a counter-support. The forcing element has a first forcing working face, which is adapted to act on the first braking profile, and a second forcing working face, which is adapted to act on the second braking profile. The counter-support has a first counter-support working face, which is adapted to act on the first braking profile, and a second counter-support working face, which is adapted to act on the second braking profile. The first forcing working face and the first counter-support working face are arranged opposite one another at the first braking profile and the second forcing working face and the second counter-support working face are arranged opposite one another at the second braking profile. In addition, the forcing element can be spread, and the spreading brings the first forcing working face into contact with the first braking profile and the second forcing working face with the second braking profile.

According to a further aspect of the invention, a guiding system for a traveling body of an elevator installation solves the problem. The guiding system is suitable for guiding the traveling body on preferably two rails having a first braking profile and a second braking profile. The guiding system comprises three or more guiding elements which are configured to guide the traveling body in such a way that its orientation and position relative to the rails are essentially maintained. At least one of the guiding elements is configured as brake devices according to the invention. In particular, the counter-support working faces serve as guiding surfaces.

Another aspect of the invention relates to an elevator installation that solves the task and that has the brake device and the rail with a first braking profile and a second braking profile. The rail is formed from one or more sheet metal parts.

Possible features and advantages of embodiments of the invention can be considered, inter alia and without limiting the invention, to be based upon the concepts and findings described below.

The first forcing working face and the second forcing working face are each surfaces of the forcing element. The first counter-support working face and the second counter-support working face are each surfaces of the counter-support.

In a rest position, in which the brake device has not yet been triggered, the forcing element is removed from the surfaces of the braking profiles. The forcing element, and in particular the forcing working faces of the forcing element, cannot touch the braking profile. The counter-support, and in particular its counter-support working faces, can touch the braking profile. Typically, one of the two counter-support working faces touches the corresponding braking profile, and thereby transmits a guiding force between the braking profile and the traveling body. At this moment there is play between the other counter-support working face and the other braking profile. In the rest position, the function of transferring the guiding force can thus alternate between the first braking profile having the first counter-support working face and the second braking profile having the second counter-support working face and thus adapt to the direction of the guiding force.

The brake device is used to brake the traveling body on the rail. To initiate a braking operation, each of the forcing working faces of the forcing element are advanced in the direction of the counter-support working faces. In this case, the first forcing working face is advanced in the direction of the first counter-support working face, and the second forcing working face is advanced in the direction of the second counter-support working face. The forcing element preferably has a braking element such as, for example, a brake wedge. If the forcing element has a brake wedge, the contact of the brake wedge with the braking profile moving past leads to an increase in the contact pressure in the direction of the advancing motion. With or without this reinforcement, the forcing element generates a sufficiently large contact pressure in the direction of the advancing motion. The forcing element presses on both braking profiles. The rail is configured in such a way that the braking profiles are elastically, i.e. reversibly, deformed under the contact pressure. The deformation is limited by the counter-support.

As soon as the braking profile rests against the counter-support, and in particular against the two counter-support working faces, the respective braking profile is clamped between the counter-support working face and the forcing working face. The brake device now develops the full braking force. The pressing forces lead to frictional forces, which cause the braking force of the brake device, both against the two forcing working faces and against the two counter-support working faces.

The rail is a profile that is arranged along the travel path of the traveling body. The rail includes the first and the second braking profile. The two braking profiles are preferably connected to one another at the rear. A typical shape is, for example, a C-profile.

The rail is advantageously configured in such a way that it can be easily and securely fastened in the shaft by there being openings, elongated holes or boreholes on the braking profile, for example, which are used to fasten the braking profile.

The rail is advantageously produced from sheet metal by means of a bending operation or roll profiling. On the one hand, it can be an open profile. Essentially, a relatively thick sheet is folded at two bending edges. This creates a profile, preferably similar to a C-profile, with the two braking profiles and the rear connection. The creation of an open profile requires only a few work steps and is therefore inexpensive, among other things. On the other hand, it can also be a closed profile. A closed profile is a typically more complex part that is mostly made by roll profiling. One edge of the sheet is typically connected to the other edge of the sheet, and a cross section through the profile is connected several times. The two profiles are preferably configured as a fold, that is to say a double layer of sheet metal. An adhesive or a filler can be applied between the two sheets of the double layer, or they are in contact with one another. The rear connection is advantageously configured as a hollow profile, which results in a high level of strength in the rail, in particular with regard to the guiding forces.

Alternatively, the rail can also be made from machined strand material. A hot-rolled C-profile is preferably used as the blank. The C-profile in turn includes the two braking profiles and a rear connection. The braking profiles are now machined, preferably by milling, in such a way that the two braking profiles each receive at least one smooth surface which is used to guide the traveling body. In particular, the machined surfaces are used for contact with the counter-support working faces of the counter-support. Advantageously, however, two or three surfaces of each braking profile are machined. Hybrid manufacturing processes are also conceivable in which, instead of the hot-rolled extruded profile, a relatively thick sheet metal is formed into a C-profile, and this is then machined in such a way that smooth surfaces are created.

In order to be able to easily transport and install the rails, they are preferably divided into segments. Typically such segments are 5 m or 2.5 m long.

According to a preferred embodiment of the brake device, the first, the second or both braking profiles are configured essentially as a plate with a constant plate thickness.

The braking profile advantageously has an essentially constant plate thickness over the entire extent of the braking profile along the travel path of the traveling body. The plate thickness can comprise a plurality of layers of material or consist of one layer of material. The design in the form of a plate is easy to manufacture.

The two braking profiles are at an angle to each other. This angle is preferably 0°, so that the braking profiles are arranged parallel to one another. The braking profiles can also be at an angle that can be larger or smaller than 0°. As a result, the braking profiles, starting from the rear connection, move further apart, or the braking profiles, starting from the rear connection, move closer together.

Alternatives to a braking profile in the form of a plate are, for example, rounded rod-shaped braking profiles, T-shaped braking profiles or wedge-shaped braking profiles. Braking profiles with such alternative shapes can transfer other guiding forces by means of a form fit.

According to a further preferred embodiment, the first forcing working face and the second forcing working face have opposite surface normals, and the first counter-support working face and the second counter-support working face have opposite surface normals.

The working faces are configured to interact with the typically flat surface of one of the braking profiles. It is therefore advantageous that the working faces are configured to be essentially flat. The working faces can have surface structures such as, for example, profiling or roughening. Such surface structures are used to achieve an optimal braking effect on the forcing working faces or to achieve an optimal braking effect and/or optimal sliding properties on the counter-support working faces.

Surface normals are to be understood as pointing away from the working faces in the direction of the braking profile with which the working faces are intended to interact. The surface normal is perpendicular to the plane of the working face.

It is advantageous that the first forcing working face and the second forcing working face have opposite surface normals and the first counter-support working face and the second counter-support working face have opposite surface normals, because the normal forces on the forcing working faces essentially compensate each other. The normal forces on the first forcing working face and the normal forces on the second forcing working face are essentially of the same amount. Because the surface normals are opposite, the forces essentially cancel each other out. If the surface normal deviates from the opposite orientation by a small angle, a large resultant force would arise on the forcing element. This large resulting force on the forcing element would then have to be absorbed, for example, by the connecting element or the attachment on the traveling body. The explanations of this paragraph apply identically to the counter-support, i.e. the normal forces of the counter-support working faces also essentially compensate each other and the analogous remarks apply as for the forcing working faces.

In this embodiment, the braking profiles are advantageously aligned parallel to one another.

According to a first of two alternative embodiments the first and the second forcing working face are arranged essentially in an intermediate region between the first and the second braking profile, and the first and the second counter-support working face are each arranged on the side of the first and the second braking profile that faces away from the intermediate region.

The intermediate region is to be understood as the space that is spanned by those planes that are spanned by the respective inner surfaces of the two braking profiles.

In these embodiments, the counter-support engages around the two braking profiles from the outside, and the forcing element is arranged in the intermediate region. To initiate a braking operation, the forcing element is spread apart, as a result of which the forcing working faces of the forcing element are advanced in the direction of the counter-support working faces.

In other words, the first forcing working face and the second forcing working face move away from one another due to the spreading of the forcing element. For this purpose, the forcing element can have two parts that are pushed apart by a mechanism.

According to a second embodiment, the first and the second counter-support working face are arranged in an intermediate region between the first and the second braking profile, and the first and the second forcing working face are each arranged on the side of the first and second braking profile that faces away from the intermediate region.

According to a further embodiment, the forcing element has a distance between the forcing working faces which can be narrowed, and the narrowing of the distance between the forcing working faces brings the first forcing working face into contact with the first braking profile and the second forcing working face with the second braking profile.

In these second and further embodiments, the forcing element engages around the two braking profiles from the outside, and the counter-support element is arranged in the intermediate region. To initiate a braking operation, the forcing element is narrowed, as a result of which the forcing working faces of the forcing element are advanced in the direction of the counter-support working faces.

The way in which the brake works is primarily that the first forcing working face and the first counter-support working face jointly clamp the first braking profile, and the second forcing working face and the second counter-support working face jointly clamp the second braking profile. Either the counter-support is on the outsides of the braking profiles and the forcing element is on the insides of the braking profiles, or the counter-support is on the insides of the braking profiles and the forcing element is on the outsides of the braking profiles. In both variants, it is advantageous that the normal forces that arise during braking both on the counter-support and on the forcing element essentially cancel each other out. The resulting force thus essentially comprises the braking force generated by friction.

According to a preferred embodiment, the brake device comprises an actuator which is adapted to bring about an advancing motion against the forcing element. The forcing element can be brought into contact with the braking profile by the advancing motion.

The spreading or narrowing of the forcing element, which make it possible for the forcing working faces to be advanceable against the braking profiles, is referred to as the advancing motion. Advantageously, the actuator drives a motion that allows two subregions of the forcing element to slide apart from or slide toward one another and thereby leads to the advancing motion. Such an advancing motion can be driven by the actuator in that the actuator is supplied with energy from the outside in the form of electricity, compressed air or hydraulics, or in that the actuator contains an energy store which stores the energy for a relative motion of the subregions of the forcing element. In both cases, the direction of the advancing motion of the forcing working faces runs in a direction which has at least a minimal motion component in the direction of the surface normals of the braking profile.

One embodiment is an electric motor which is able to remove one of the subregions of the forcing element from another of the subregions via a linear drive, thereby causing the forcing element to expand. The two subregions each include a forcing working face, which is preferably configured in the form of a brake lining.

According to a preferred embodiment, the forcing element comprises a braking element, preferably two braking elements, which can be brought into contact with the first braking profile and/or the second braking profile and can be brought into a braking position by a travel motion along the rail.

According to a preferred embodiment, the forcing element comprises a brake wedge or an eccentric, the forcing element being configured such that a motion of the brake device in a direction along the braking profile leads to an increase in the contact pressure of the forcing element against the braking profile.

The braking elements, in particular in the form of brake wedges or eccentrics, each form a partial region of the forcing element and each have a forcing working face. The forcing element can also comprise further subregions, in particular this can be, for example, a guide for the braking elements.

The forcing element preferably has a first braking element. The first braking element has the first forcing element working face. An advancing motion moves the first braking element toward the first braking profile until it comes into contact with it. The contact initially involves a relatively low normal force. The contact of the first braking element with the first braking profile generates frictional forces, so that the driving motion moves the braking elements with it and shifts them into a braking position. This increases the normal force. The normal force leads to a frictional force that is large enough to brake and hold the traveling body.

The advantage is that the advancing motion can be brought about by a drive or an advancing spring with a small force. The main part of the normal force builds up in that the travel motion through the braking element leads to a further advancing motion. If the forcing element exclusively has a first braking element, then there is an advantage that only the one braking element has a bearing, and the production of the brake device is therefore inexpensive.

The forcing element advantageously has a first braking element and a second braking element. The first braking element has the first forcing element working face, and the second braking element has the second forcing element working face. The two braking elements are brought into contact with the braking profiles via an advancing motion. The contact initially involves a relatively low normal force. As a result of the travel motion, the contact between the braking elements and the braking profiles means that the braking elements can be brought into a braking position.

The advantage of the brake device with two braking elements lies in the symmetrical further advancing motion of the braking elements upon contact with the braking profiles, which ensures that the braking forces on the first forcing working face and on the second forcing working face increase synchronously. As a result, the connecting element of this brake device can be weaker and more cost-effective, because the torques on the forcing element are relatively small.

It is also advantageous that the release of the brake device after braking requires only a small releasing force. Because both braking elements are slidably mounted on the forcing element, a releasing force is sufficient which can move the two braking elements back to their original position along their support on the forcing element with little effort.

Alternatively, the forcing element can have only one braking element. Such an embodiment is more cost-effective, because only one braking element is movably guided. The advancing is no longer symmetrical. On the first side, the one with the braking element, there is sliding between the first counter-support working face and the first braking profile, and there is thus a frictional force during engagement. The braking element initially still adheres to the braking profile. Because it is guided with little friction, the static friction force is very low. On the second braking profile, however, neither the forcing working face nor the counter-support working face move with the braking profile, so both forcing working faces are subject to frictional forces. During the engagement, the braking force on the second braking profile is therefore significantly greater than on the first braking profile. Essentially the same applies to releasing the brake device. The braking element slides very easily along the guide, while the other three working faces that are not on a braking element cause large forces due to the sliding friction when the traveling body is lifted out, which forces, in addition to the weight of the traveling body must be overcome.

According to a preferred embodiment, the actuator can be activated by an electrical or electronic signal.

The electrical signal that is supplied from the outside can itself provide enough energy to bring about the advancing motion, for example via an electric motor, or the electrical signal controls the advancing motion that is driven by other energy sources. The other energy sources serve, for example, as a separate electrical power supply or an energy store, such as a tensioned spring of the forcing element. The electrical or electronic signal only serves to release the flow of energy from this energy source or this energy store.

In an advantageous embodiment, a tensioned spring is held by a pawl. By switching off the supply current of the electromagnet that holds the pawl, the tensioned spring is initially partially relaxed in order to move the subregions of the forcing element relative to one another. The remaining spring tension serves as a normal force on the working faces. The braking profiles, or their connection to one another, are/is configured in such a way that the play for the counter-support is overcome due to the forces caused by the forcing element, and thus the braking profiles can be clamped between the forcing working faces and the counter-support working faces.

According to a further embodiment, the counter-support and the forcing element are directly connected to one another by means of a connecting element.

According to a preferred embodiment, the connecting element allows a relative motion of the forcing element relative to the counter-support, which in the region of the first forcing working face and the second forcing working face is essentially perpendicular to the first forcing working face, to the second forcing working face, to the first counter-support working face and/or to the second counter-support working face.

The relative motion therefore runs essentially horizontally in the installed state in the case of a vertically moving elevator.

Because the four working faces mentioned are aligned parallel to one another at least in pairs, a direction perpendicular to one of these working faces essentially denotes a direction which is also vertical to at least one of the other working faces. All four working faces are preferably aligned essentially parallel to one another; therefore, a direction perpendicular to one of these working faces denotes essentially a direction which is also vertical to all other working faces.

The relative motion of the forcing element relative to the counter-support which is permitted by the connecting element essentially has the direction described, especially in the region of the first and second forcing working face, so that the forcing element is positioned freely according to the deformation of the two braking profiles. This allows the two forcing working faces to apply the same normal force to the braking profiles.

The connecting element is preferably configured as a one-piece component. A slight elasticity of the connecting element allows the relative motion. Alternatively, however, a design is also conceivable in which an articulation or a linear bearing of the forcing element enables the relative motion. When using an articulation or a linear bearing, there is preferably a centering device which centers the forcing element relative to the counter-support element. For example, a ball catch or a spring on the connecting element could hold the forcing element in a central position so that the forcing element has a play in relation to the two braking profiles during the driving operation.

The guiding system advantageously uses the counter-support working faces as guiding surfaces of a guiding element. This has the advantage that a guiding element can be replaced in each case by using this brake device. A conventional traveling body typically has exactly four guide units and typically exactly two brake devices. In a preferred embodiment, two of the conventionally installed guiding elements are replaced by the brake device. A car preferably has two brake devices with a guiding function and two conventional guiding elements. This arrangement is particularly advantageous if the two brake devices are attached to the bottom of the traveling body and the two conventional guiding elements are attached to the top of the traveling body. The conventional guiding elements are configured in their geometric shape so that they either guide against one of the two braking profiles or, advantageously, guide against both braking profiles. In this case, the guiding elements, analogous to the guiding properties of the counter-support, contact both inner sides of the two braking profiles or both outer sides of the two braking profiles.

Guiding forces act essentially perpendicular to the direction of motion of the traveling body and in the plane of at least one working face can advantageously be transmitted via the front edges of the braking profiles. Alternatively, it is also possible to transfer these forces via a separate sliding coating, for example to the base of the rail in the form of a C-profile.

The elevator installation having a rail that is formed from sheet metal parts is particularly inexpensive to manufacture and install. In particular, by designing the rail profiles as closed rail profiles, it is possible to achieve excellent rigidity and, at the same time, a very lightweight design. The closed rail profiles can also serve as cable ducting. Or they are filled with a material that is used to improve strength, reduce noise or improve driving quality in general.

The rail, as a component of the elevator installation, is preferably used as a rail for braking the traveling body and as a rail for guiding the traveling body. Alternatively, the rail can only serve as a brake rail. The rail is inexpensively manufactured from sheet metal parts.

Further advantages, features and details of the invention will become apparent from the following description of embodiments and from the drawings, in which identical or functionally identical elements are denoted with identical reference signs. The drawings are merely schematic and not to scale.

DETAILED DESCRIPTION

Figure 1:
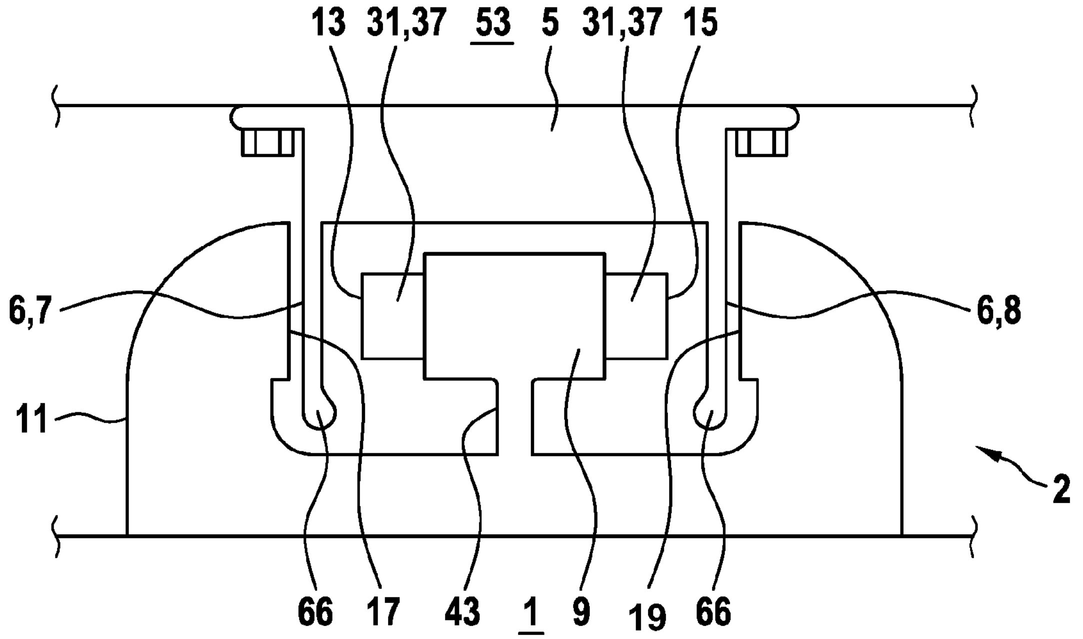
FIG. 1 is a horizontal section through a first embodiment of the brake device.

FIG. 1 shows a horizontal section through a first embodiment of the brake device 2 as it is attached to a traveling body 1. The brake device 2 essentially comprises the counter-support 11 and the forcing element 9, which are connected to one another via the connecting element 43. The brake device is in engagement with a first braking profile 7 and a second braking profile 8, both of which are part of the rail 5. The rail 5 is a closed profile rolled from sheet metal. The braking profiles 6 (7, 8) have two layers and have a slightly larger bending radius 66 at their end. A closed profile has the advantage that it is more rigid than an open profile. The rail is fastened to a rail support 53 with screws. The rail support 53 can, among other things, be a metal profile or a shaft wall.

The first forcing working face 13 and the first counter-support working face 17 are arranged in such a way that the first braking profile 7 runs between them. The second forcing working face 15 and the second counter-support working face 19 are arranged in such a way that the second braking profile 8 runs between them. The forcing element is configured in such a way that it can spread in order to bring the brake device, starting from the rest position, into contact with the braking profile. Spreading brings the braking elements 31, i.e., the brake wedges 37, closer to the braking profiles 6. The brake wedges 37 perform a linear motion with a main motion component in the direction of travel. The motion component in the direction of the braking profile 6 serves to build up a normal force on the working faces 13, 15, 17 and 19.

The forcing element 9 is located in the intermediate region between the two braking profiles 6. An explanatory illustration of the intermediate region can be found in FIGS. 10 and 11.

The connecting element 43 is configured to be slightly elastic, so that the forcing element 9 can move easily between the braking profiles 6. The elastic restoring force of the connecting element 43 keeps the forcing working faces 13 and 15 at a distance from the braking profiles 6. The normal forces on the four working faces have essentially the same amounts due to the chosen arrangement.

Figure 2:
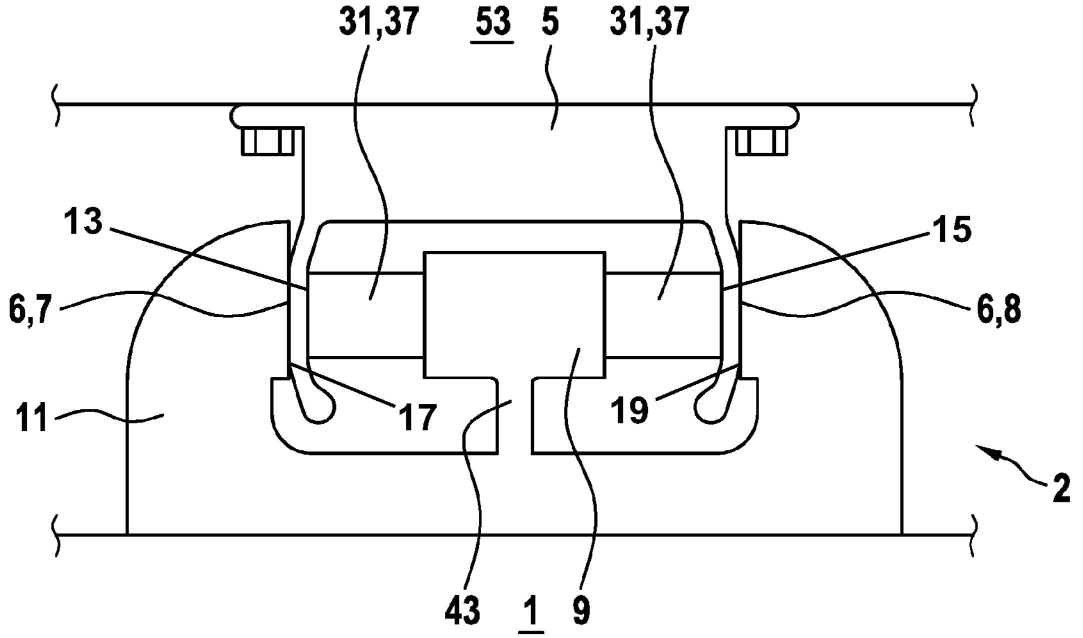
FIG. 2 shows the same section as in FIG. 1 with the catch wedges in the braking position.
Figure 7:
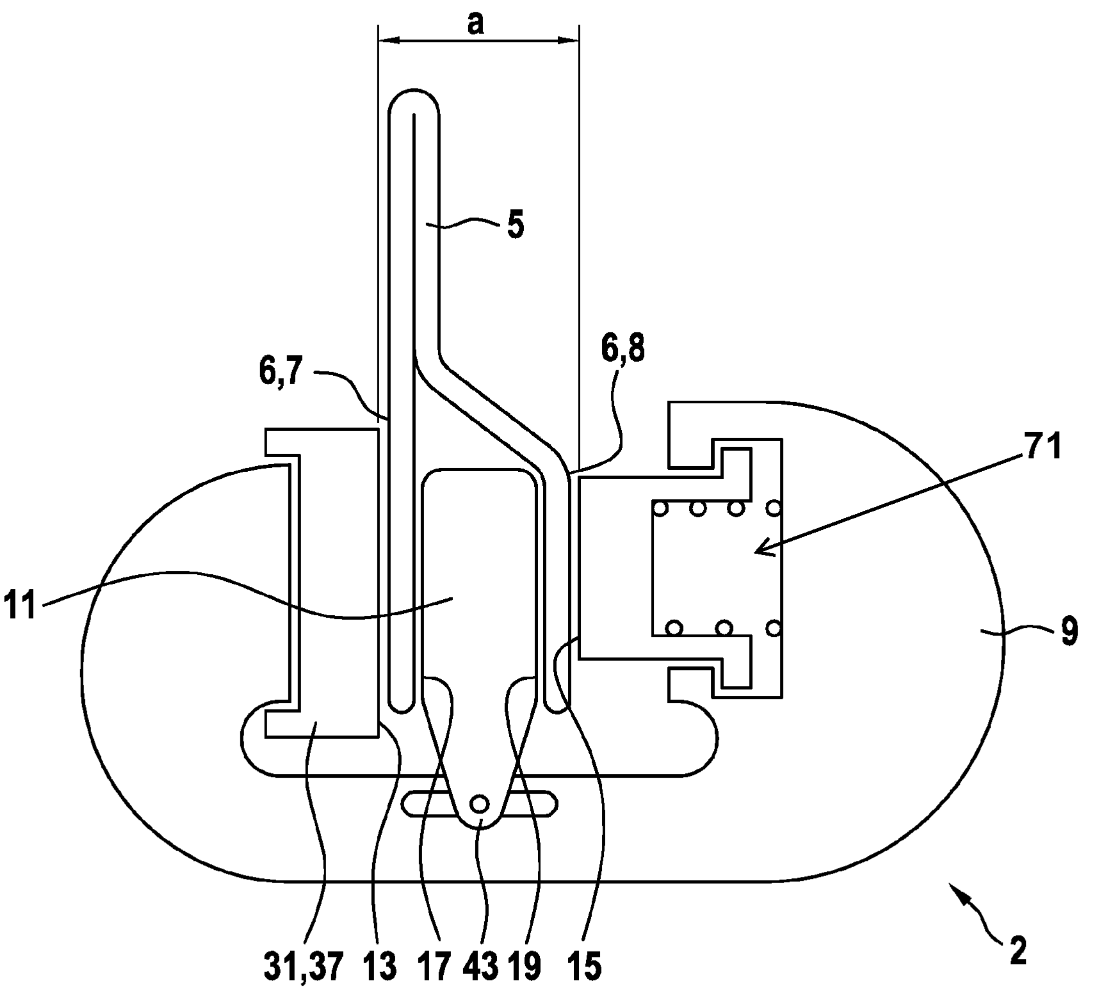
FIG. 7 shows a brake device not according to the invention having an external forcing element.

FIG. 2 shows a view of the first embodiment as in FIG. 1 in an operating state in which the brake device 2 is braking. The braking elements 31, that is to say the brake wedges 37, are shifted into the braking position. The brake wedges 37 are displaced by the frictional force on the braking profiles 6 in such a way that the first forcing working face 13 and the second forcing working face 15 are pressed against the braking profiles 6. The rail 5 is elastically and reversibly deformed. The braking profiles 6 are resilient and displaced up to the first counter-support working face 17 and the second counter-support working face 19. This shift is accompanied by a slight deformation of the rail 5. Large normal forces act on the braking profiles 6 clamped between the brake wedges 37 and the counter-support 11. These normal forces cause large frictional forces. The normal force is limited in that the displacement of the brake wedges is limited, and in that the counter-support is adapted to be elastic in such a way that the braking force is limited in the range of a setpoint value when the forcing element 9 is maximally spread. A set of springs as shown in FIG. 7 can also be used to limit the braking force.

Figure 3:
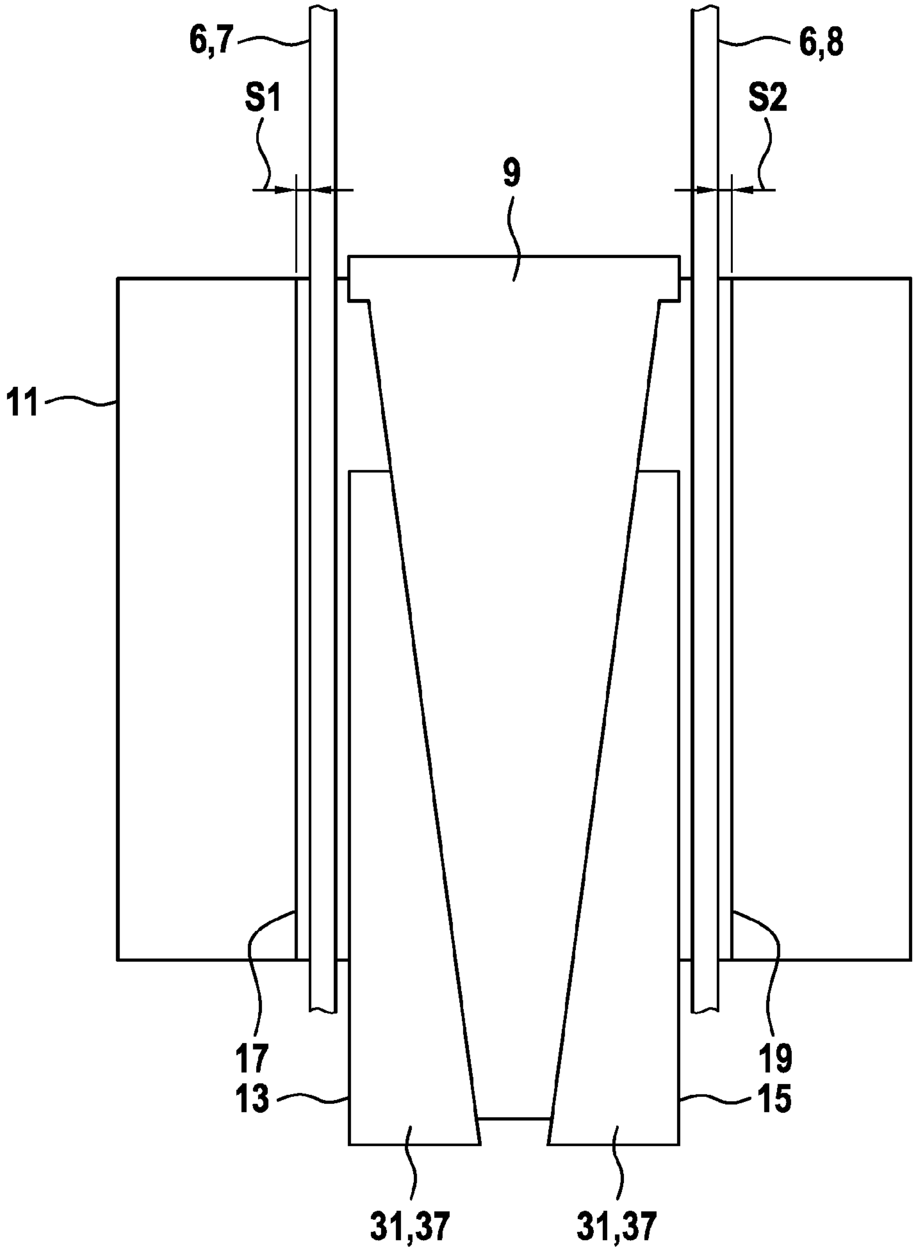
FIG. 3 is a side view of the first embodiment as in FIG. 1.

FIG. 3 shows a side view of the first embodiment as from FIG. 1. The braking elements 31 in the form of brake wedges 37 are guided along a core element of the forcing element 9.

The first embodiment is suitable to be used as a guiding element in a guiding system. There is an initial play S1 between the first counter-support working face 17 and the first braking profile 7. There is a second play S2 between the second counter-support working face 19 and the second braking profile 8. During driving of the traveling body, the two plays S1 and S2 will adapt to the loads on the guiding element. Typically, one of the two plays is canceled by touch. The other play is correspondingly larger. A guiding force can be transferred via touch. As a result, the traveling body for the brake device 2 is guided securely against displacements perpendicular to the working faces 13, 15, 17 and/or 19. A displacement of the brake device 2 toward the rail is prevented by the fact that the braking profiles 6 with the enlarged bending radius 66 are in contact with the counter-support 11. Alternatively, it would also be conceivable that the forcing element 9 has a sliding coating on the surface opposite the connecting element 43.

Figure 4:
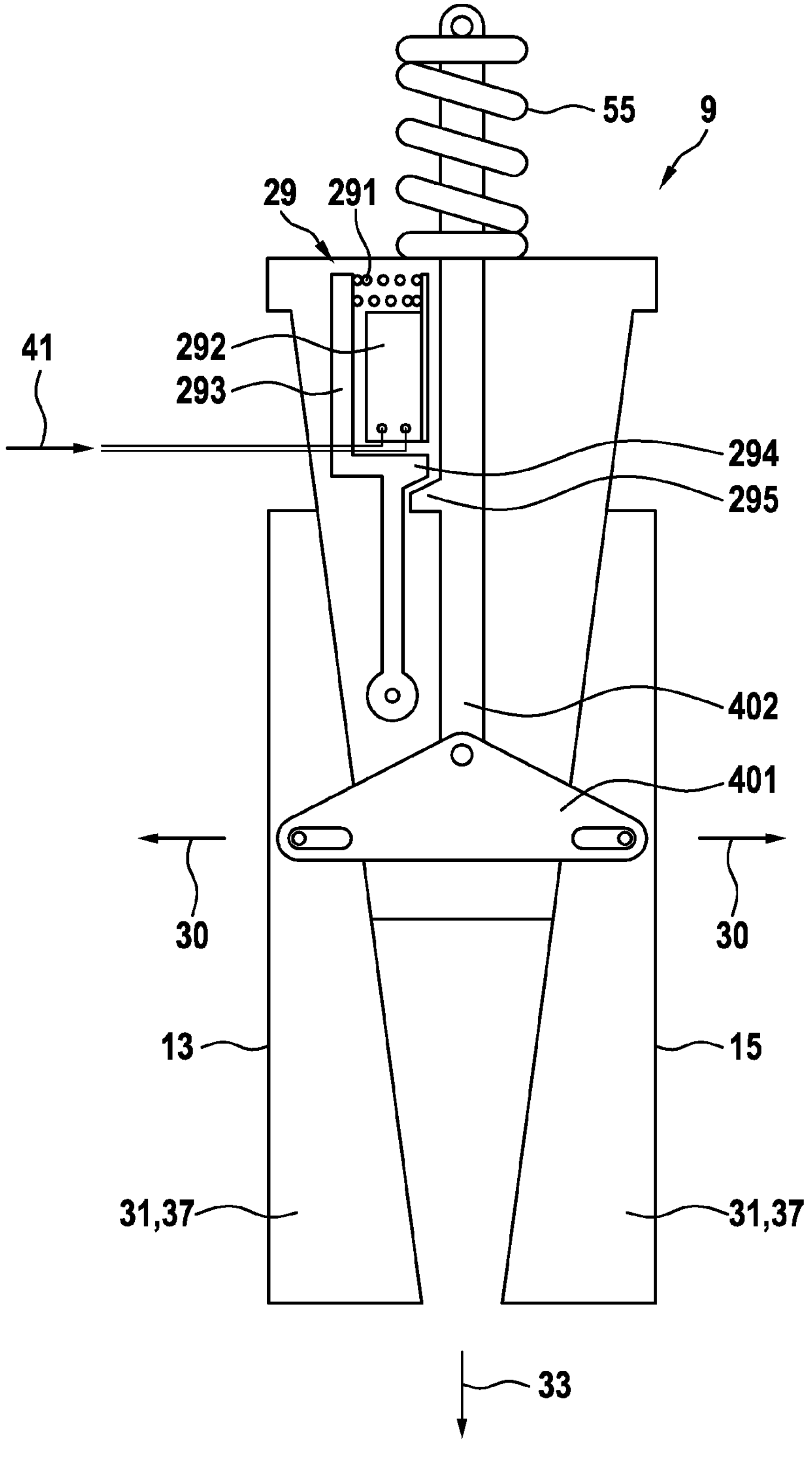
FIG. 4 shows a forcing element with an actuator.
Figure 6:
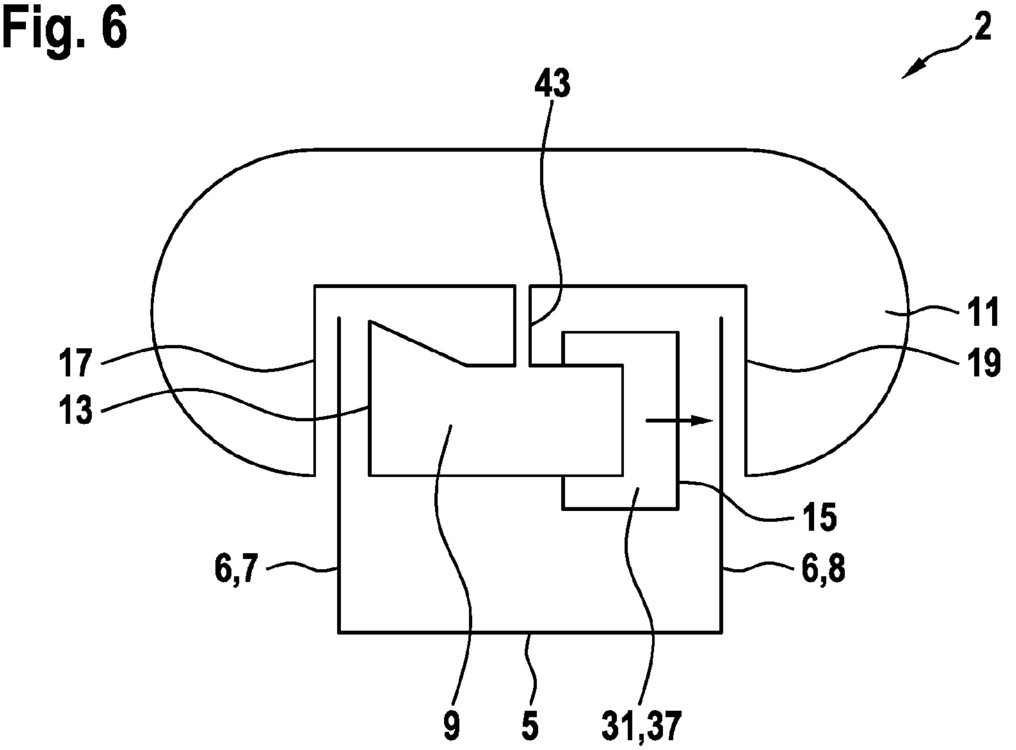
FIG. 6 shows brake device with a forcing element with only one wedge.

FIG. 4 shows a forcing element 9 with an actuator 29 as it is used in a brake device 2 in FIGS. 1, 2, 3 and, however, only for a brake wedge 37, also in FIG. 6. In order to be able to spread the first forcing working face 13 on the first brake wedge 37 and the second forcing working face 15 on the second brake wedge 37 away from one another within the context of an advancing motion 30, the brake wedges are connected to a tension plate 401. The tension plate 401 is connected via a tension rod 402 to an energy store 55 in the form of a spring. An electromagnet 292 is able to draw in a ratchet lever 293. If an electrical or electronic signal 41 from outside, in particular the drop in a supply voltage, leads to the electromagnet being switched off and the electromagnet losing its holding ability as a result, a pawl 294 is released from a retaining lug 295 on the pull rod 402. As a result, the braking elements 31, or more precisely the brake wedges 37, are now moved upward and spread apart from one another in the process. An auxiliary spring 291, which is used to reliably detach the ratchet lever 293 from the electromagnet 292, also serves to reliably trigger the pawl 294. By skillful configuration of the contact surface between the retaining lug 295 and the pawl 294, the auxiliary spring 291 can be dispensed with in an alternative embodiment.

Because the traveling body moves in the direction of travel 33, the frictional force between the brake wedges 37 and the braking profiles 6 helps to drive the brake wedges 37 further upward as soon as the brake wedges 37 contact the braking profiles 6.

Figure 5:
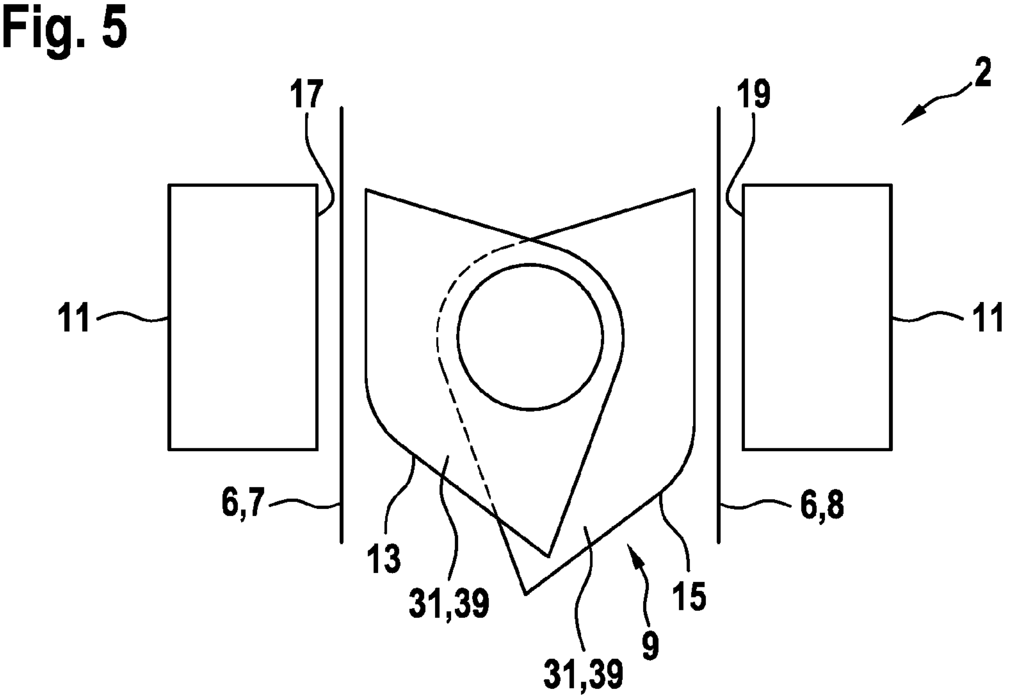
FIG. 5 shows a brake device with eccentrics.

FIG. 5 shows a forcing element 9 with braking elements 31, which are configured as eccentrics 39. The mode of operation of such an embodiment is analogous to FIGS. 1 to 4. The advancing motion of the eccentric 39, in contrast to the advancing motion of the brake wedge 37, is based on a rotary motion of the eccentric 39.

FIG. 6 shows a brake device 2 which has a forcing element 9 that has only a braking element 31, in this case in the form of a brake wedge 37. The first forcing working face 13 is configured directly against the forcing element 9. A very thin connecting element 43 is also shown. The rail 5 and the counter-support 11 with the two counter-support working faces 17 and 19 are essentially configured in the same way, as in the previous figures, each comprising two braking elements 31. When this brake device is engaged, the first forcing working face 13 is already rubbing against the first braking profile 7, while the second forcing working face 15 adheres to the second braking profile 8 and is thereby entrained, leading to an increase in the normal force and thus the braking force on the first forcing working face 13. The second forcing working face 15 is not yet producing any substantial braking forces, because the braking element 31 is guided against the forcing element 9 essentially without friction. Only when the braking element 31 hits a stop on the forcing element 9 will the braking force generated on the second forcing working face 15 also make a significant contribution to the braking force.

FIG. 7 shows a brake device 2 with an outer forcing element 9. The forcing element 9, which has a distance a between the first forcing working face 13 and the second forcing working face 15, can be narrowed. The narrowing of the forcing element, that is to say a reduction in the distance a between the two forcing working faces 13 and 15, brings the two forcing working faces 13 and 15 into contact with the braking profiles 6. The brake device 2 comprises a brake wedge 37 and a spring assembly 71, both of which are attached to the forcing element 9. As a result, the counter-support can have a very simple configuration. In contrast to the previous embodiments, the counter-support 11 is now in the intermediate region between the first braking profile 7 and the second braking profile 8. The connecting element 43 allows a relative displacement of the counter-support 11 relative to the forcing element 9. The two counter-support working faces 17 and 19 can therefore each rest against the braking profiles 6 and can transmit the pressure forces between the counter-support working faces 17 and 19 without exerting great forces on the connecting element 43.

The rail 5 is formed from sheet metal and configured asymmetrically. The open profile allows production with just a few work steps.

The concepts of FIG. 7 can also be combined with the concepts from the preceding figures. In particular, it is possible for the forcing element 9 to have braking elements 31 on both sides. In such a case, it is advantageous to make the counter-support 11 somewhat flexible in order to obtain a defined braking force. For example, the counter-support could have a spring assembly 71. The braking elements 31 can be configured as brake wedges 37 or eccentrics, even as a single eccentric. Instead of the open braking profile 5, a closed braking profile 5 can also be used.

Figure 8:
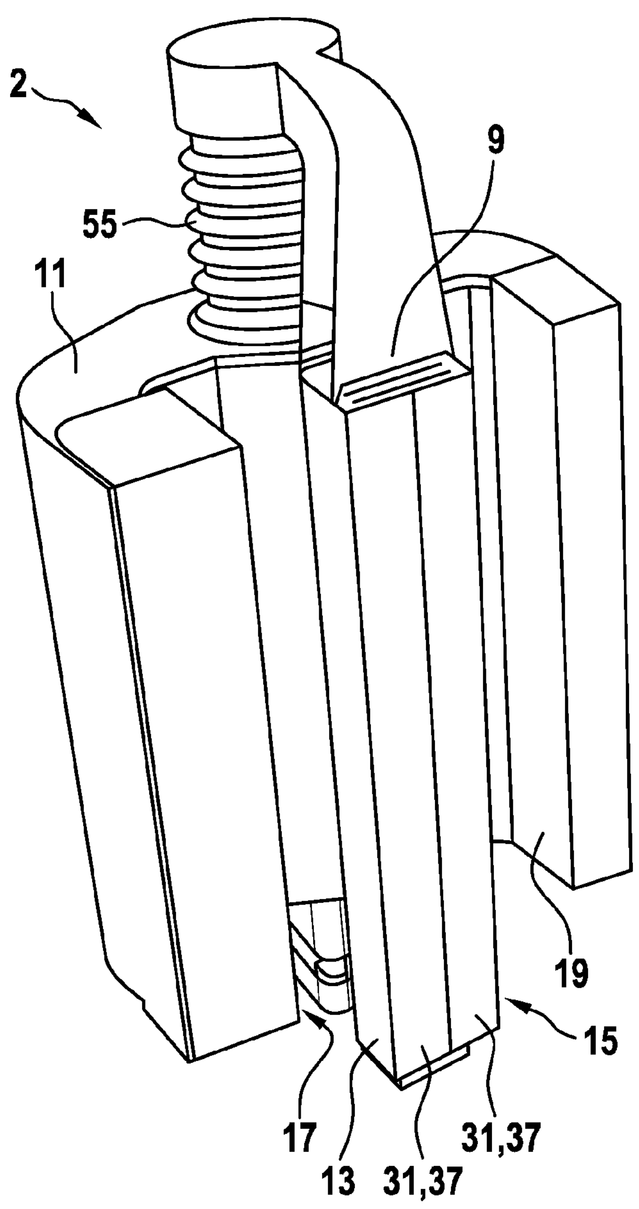
FIG. 8 is an isometric view of a designed solution.

FIG. 8 shows an isometric view of a designed solution. The forcing element 9 is located in the intermediate region between the braking profiles (not shown).

The actuator, of which the energy store 55 is visible, is located in the interior of the counter-support 11. The braking elements 31 are configured as brake wedges 37, the first forcing element working face 13 and the second forcing element working face 15 each being located on a brake wedge 37. The counter-support 11 has the first counter-support working face 17 and the second counter-support working face 19. The counter-support working faces 17 and 19 are configured as sliding linings in order to serve as guidance for the traveling body.

Figure 9:
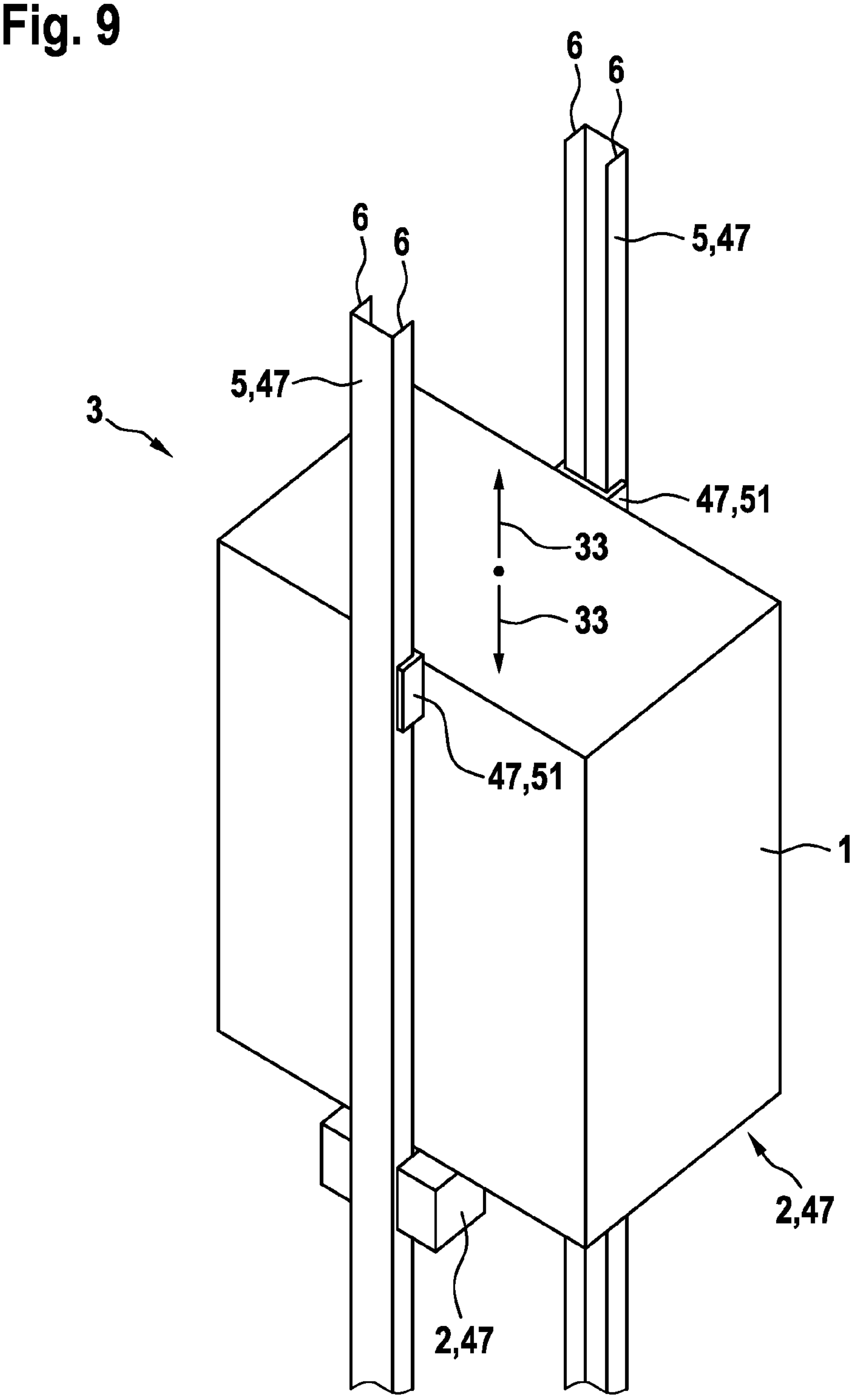
FIG. 9 shows a guiding system with rail and brake device.

FIG. 9 shows a guiding system 47 of an elevator installation 3 with a rail 5 and a brake device 2. The rail 5 comprises two braking profiles 6 in each case. The rail 5 serves as a guide for the traveling body 1, so that it can move along the rail 5 in the direction of the traveling motion 33. In addition to the two brake devices 2 at the bottom of the car, the traveling body 1 is also guided via two further guiding elements 51.

The guiding elements 51 and the brake devices 2 guide the traveling body 1 via contact with the respective outer surfaces of the braking profiles 6.

Figure 10:
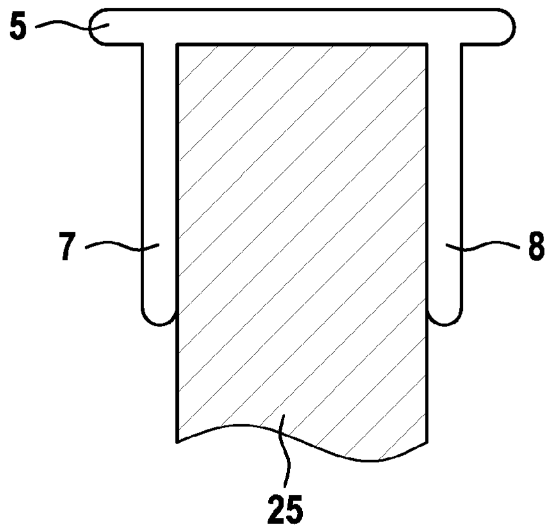
FIG. 10 is a representation of the intermediate region.
Figure 11:
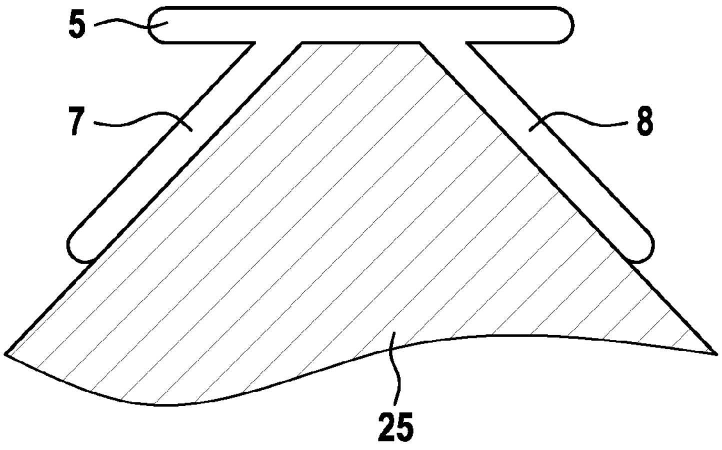
FIG. 11 is another representation of the intermediate region.

FIGS. 10 and 11 show detailed definitions of the intermediate region 25. The intermediate region 25 is to be understood as the space that is spanned by those planes that are spanned by the respective inner surface of the first braking profile 7 and the second braking profile 8.

Finally, it should be noted that terms such as "comprising," "having," etc. do not preclude other elements or steps, and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A brake device for braking a traveling body of an elevator installation on a rail, the rail having a first braking profile and a second braking profile, the brake device comprising:

a forcing element having a first forcing working face adapted to act on the first braking profile and a second forcing working face adapted to act on the second braking profile;

a counter-support having a first counter-support working face adapted to act on the first braking profile and a second counter-support working face adapted to act on the second braking profile;

wherein the first forcing working face and the first counter-support working face are arranged opposite one another at the first braking profile and the second forcing working face and the second counter-support working face are arranged opposite one another at the second braking profile;

wherein the forcing element is adapted to be spread to bring the first forcing working face into contact with the first braking profile and the second forcing working face into contact with the second braking profile; and wherein the first forcing working face and the second forcing working face are arranged in an intermediate region between the first braking profile and the second braking profile, and the first counter-support working face and the second counter-support working face are each arranged on a side of the first braking profile and the second braking profile respectively that faces away from the intermediate region.

2. The brake device according to claim 1 wherein at least one of the first and second braking profiles is configured as a plate with a constant plate thickness.

3. The brake device according to claim 1 wherein the first forcing working face and the second forcing working face have opposite surface normals and the first counter-support working face and the second counter-support working face have opposite surface normals.

4. The brake device according to claim 1 including an actuator that applies an advancing motion against the forcing element to bring the forcing element into contact with the first and second braking profiles.

5. The brake device according to claim 4 wherein the actuator is activated by an electrical or electronic signal.

6. The brake device according to claim 1 wherein the forcing element includes at least one braking element that is adapted to be brought into contact with the first braking profile or the second braking profile and is brought into a braking position by a travel motion of the brake device along the rail.

7. The brake device according to claim 1 wherein the forcing element includes a brake wedge or an eccentric adapted to be brought into contact with one of the first braking profile and the second braking profile, the forcing element being configured such that a motion of the brake device in a direction along the first and second braking profiles increases a contact pressure of the forcing element against the one of the first and second braking profiles.

8. The brake device according to claim 1 wherein the counter-support and the forcing element are connected directly to one another by a connecting element.

9. The brake device according to claim 8 wherein the connecting element allows a motion of the forcing element relative to the counter-support, the motion in a region of the first forcing working face and the second forcing working face being perpendicular to at least one of the first forcing working face, the second forcing working face, the first counter-support working face and the second counter-support working face.

10. A guiding system for a traveling body of an elevator installation, the guiding system adapted to guide the traveling body on two rails each having a first braking profile and a second braking profile, the guiding system including at least three guiding elements that guide the traveling body to maintain an alignment and a position of the traveling body relative to the rails, and at least one of the guiding elements being the brake device according to claim 1 wherein the first and second counter-support working faces of the brake device counter-support provide guiding surfaces contacting the rails.

11. An elevator installation including a brake device according to claim 1 and a rail with the first braking profile and the second braking profile, wherein the rail is formed from at least one sheet metal part.

12. A brake device for braking a traveling body of an elevator installation on a rail, the rail having a first braking profile and a second braking profile, the brake device comprising:

a forcing element having a first forcing working face adapted to act on the first braking profile and a second forcing working face adapted to act on the second braking profile;

a counter-support having a first counter-support working face adapted to act on the first braking profile and a second counter-support working face adapted to act on the second braking profile;

wherein the first forcing working face and the first counter-support working face are arranged opposite one another at the first braking profile and the second forcing working face and the second counter-support working face are arranged opposite one another at the second braking profile;

wherein the forcing element is adapted to be spread to bring the first forcing working face into contact with the first braking profile and the second forcing working face into contact with the second braking profile;

wherein the counter-support and the forcing element are connected directly to one another by a connecting element; and wherein the connecting element allows a motion of the forcing element relative to the counter-support, the motion in a region of the first forcing working face and the second forcing working face being perpendicular to at least one of the first forcing working face, the second forcing working face, the first counter-support working face and the second counter-support working face.

* * * * *